(12) United States Patent
Gwisdalla et al.

(10) Patent No.: US 7,261,308 B2
(45) Date of Patent: Aug. 28, 2007

(54) CYCLE ACCESSORY SYSTEM FOR CHILD STROLLERS

(75) Inventors: Kimberly S. Gwisdalla, Phoenix, AZ (US); John Michael Morgan, Phoenix, AZ (US)

(73) Assignee: Contraption Corporation, Phoenix, AZ (US)

( * ) Notice: Subject to any disclaimer, the term of this patent is extended or adjusted under 35 U.S.C. 154(b) by 8 days.

(21) Appl. No.: 10/987,848

(22) Filed: Nov. 12, 2004

(65) Prior Publication Data

US 2005/0253348 A1    Nov. 17, 2005

Related U.S. Application Data

(60) Provisional application No. 60/570,042, filed on May 11, 2004.

(51) Int. Cl.
*B62M 1/12* (2006.01)
*B62K 19/30* (2006.01)

(52) U.S. Cl. .................. 280/212; 280/282; 280/288.4; 280/87.01

(58) Field of Classification Search ................ 280/212, 280/282, 288.4, 87.01
See application file for complete search history.

(56) References Cited

U.S. PATENT DOCUMENTS

| | | | |
|---|---|---|---|
| 1,506,565 A | | 8/1924 | Clatworthy |
| 1,885,627 A | * | 11/1932 | Rader .......................... 280/204 |
| 1,954,179 A | | 4/1934 | Krug |
| 2,220,528 A | | 11/1940 | Kutil |
| 2,334,387 A | | 11/1943 | Curty |
| 2,482,585 A | | 9/1949 | Haupman |
| D327,240 S | | 6/1992 | Jackson |
| 5,395,130 A | * | 3/1995 | Rubin ......................... 280/304 |
| 5,454,578 A | | 10/1995 | Neack |
| 5,501,480 A | | 3/1996 | Ordelman et al. |
| 5,536,027 A | | 7/1996 | Gollub |
| D405,031 S | | 2/1999 | Li |
| 5,904,363 A | | 5/1999 | Li |
| 6,022,042 A | * | 2/2000 | Hartenstine .................. 280/642 |
| 6,331,013 B2 | * | 12/2001 | Choi et al. .................. 280/647 |
| 6,443,467 B1 | * | 9/2002 | Black ....................... 280/47.38 |
| 6,443,469 B1 | | 9/2002 | Cross et al. |
| D486,425 S | * | 2/2004 | Li .............................. D12/112 |
| 6,685,206 B1 | | 2/2004 | Blake |
| 6,685,207 B1 | | 2/2004 | Blake |
| 2004/0026895 A1 | * | 2/2004 | Cheng ......................... 280/642 |
| 2004/0164515 A1 | * | 8/2004 | Gunter et al. ............... 280/293 |

* cited by examiner

*Primary Examiner*—Lesley D. Morris
*Assistant Examiner*—Marlon Arce-Diaz
(74) *Attorney, Agent, or Firm*—Venable, Campillo, Logan & Meaney, P.C.

(57) ABSTRACT

The cycle accessory system for child strollers can convert an ordinary child stroller into a multi-child transport unit. The multi-child transport unit can have at least four modes. The first mode (referred to herein as the "child control" mode) allows the lead child to power and steer the multi-child transport unit. (Note: even in child control mode, an adult has the ability to at least keep the multi-child transport unit stationary.) The second mode (referred to herein as the "adult control" mode) removes the ability of the lead child to power or steer the multi-child transport unit and returns control to an adult to power and steer the multi-child transport unit. The third mode is a multi-child transport unit storage mode. And the fourth mode is a tricycle mode.

4 Claims, 6 Drawing Sheets

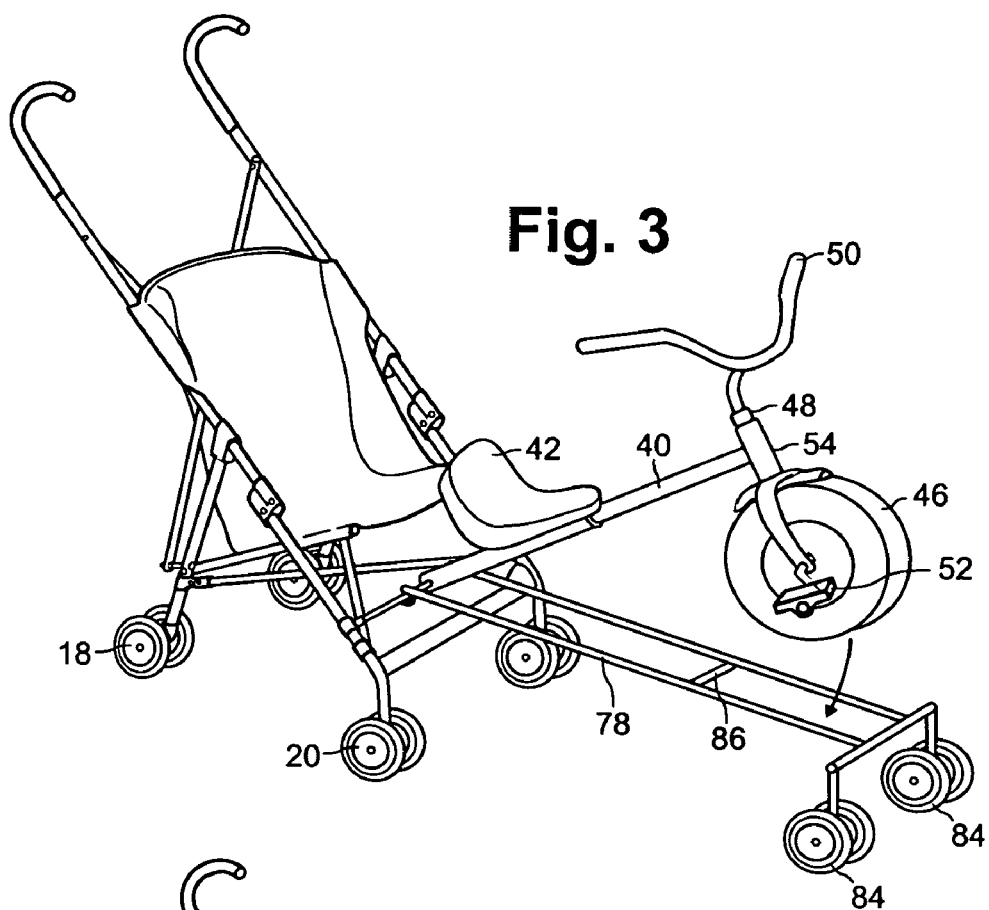
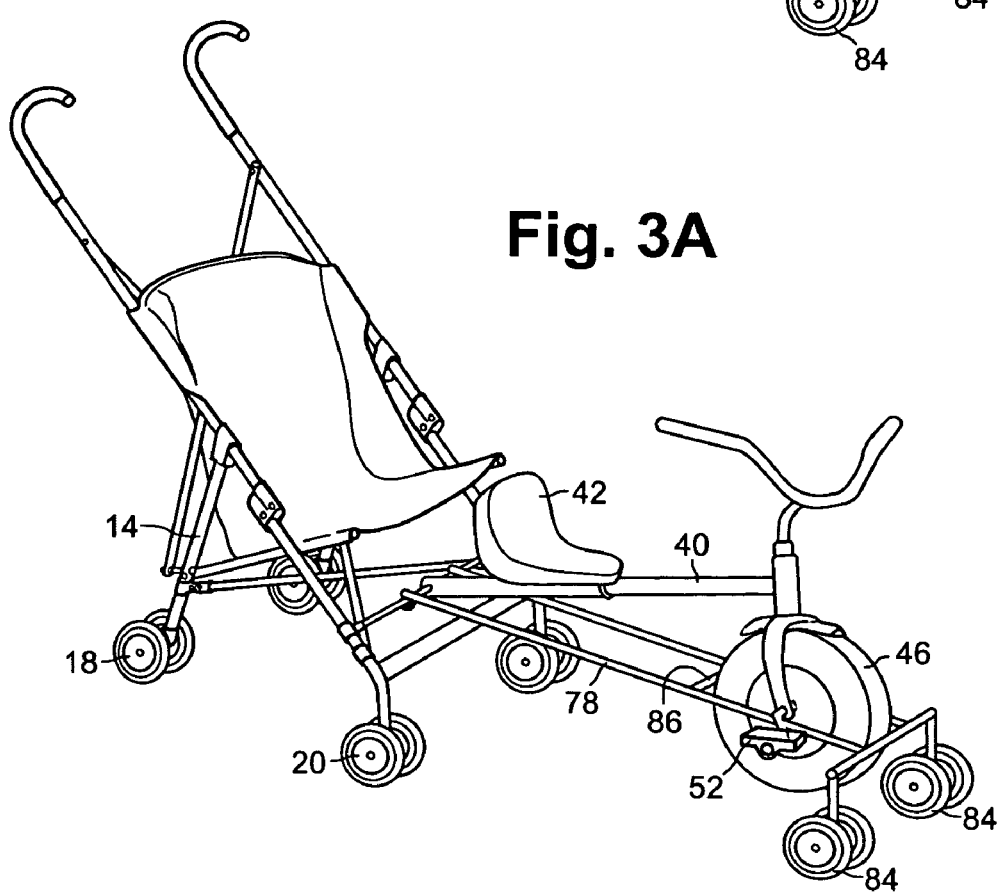

CYCLE ACCESSORY SYSTEM FOR CHILD STROLLERS

CROSS-REFERENCE TO RELATED APPLICATIONS

The present application claims priority to copending U.S. provisional application entitled "Stroller Escort," having Ser. No. 60/570,042, filed by inventor Kimberly S. Gwisdalla on May 11, 2004, which is entirely incorporated herein by reference.

FIELD OF THE INVENTION

The present invention relates generally to child strollers, and more specifically to a cycle accessory system for a child stroller.

BACKGROUND OF THE INVENTION

There are many types of child strollers. Prior devices have been disclosed in the following United States patents: U.S. Pat. No. 6,685,207 (T G Blake), U.S. Pat. No. 6,685,206 (T G Blake), U.S. Pat. No. 6,443,469 (R Cross et al.), U.S. Pat. No. 6,443,467 (D A Black), U.S. Pat. No. 5,904,363 (H Li), U.S. Pat. No. 5,536,027 (M L Gollub), U.S. Pat. No. 5,501,480 (H J Ordelman et al.), U.S. Pat. No. 5,454,578 (L E Neack), U.S. Pat. No. 2,482,585 (G G Haupman), U.S. Pat. No. 2,334,387 (F M Curty), U.S. Pat. No. 2,220,528 (C R Kutil), U.S. Pat. No. 1,954,179 (H F Krug), U.S. Pat. No. 1,885,627 (R J Rader), U.S. Pat. No. 1,506,565 (W E Clatworthy), U.S. Pat. No. D486425 (L Jackson), D405031 (H Li), U.S. Pat. No. D327240 (H Li). None, however, disclose the aspects of the current invention.

SUMMARY OF THE INVENTION

It is an object of the invention to provide a unique, collapsible and/or detachable, adult-controlled means of transporting and handling multiple children.

It is another object of the invention to provide an adult-controlled multi-mode means of transportation for the ease of handling multiple children wherein at least one mode permits full steering for the adult user without having to apply downward pressure to the stroller handle to lift the front wheel to change direction (like a jog stroller).

The invention is summarized below only for purposes of introducing embodiments of the invention. The ultimate scope of the invention is to be limited only to the claims that follow the specification. The invention is summarized as a cycle accessory system for use in combination with a child stroller (referred to generally as "the cycle accessory system"). The cycle accessory system converts an ordinary child stroller into a multi-child transport unit. The multi-child transport unit has two modes. The first mode (referred to herein as the "child control" mode) allows a child riding in the multi-child transport unit to power and steer the multi-child transport unit. (Note: even in child control mode, it is preferred that an adult have the ability to override child actions by using pushable handles on the child stroller to keep the multi-child transport unit stationary.) The second mode (referred to herein as the "adult control" mode) removes the ability of a child to power or steer the multi-child transport unit and returns complete control to an adult with respect to powering and steering the multi-child transport unit.

Generally, the cycle accessory system comprises a cycle apparatus and an optional wheel disablement device. The cycle apparatus is preferably releasably coupled to a typical child stroller. The cycle apparatus comprises a child seat, a cycle frame, a dirigible wheel, a dirigible wheel assembly, a handlebar, and pedals. The child seat is supported by the cycle frame, the dirigible wheel is rotatably and swivelably connected to a front end of the cycle frame by the dirigible wheel assembly, the handlebar is connected to the dirigible wheel assembly, and the pedals are connected to the dirigible wheel. A stroller-accessory connector releasably couples the cycle frame to the frame of the child stroller to create the multi-child transport unit that can be powered and steered by a child.

When the optional wheel disablement device is employed, the multi-child transport unit permits an adult to retain complete control over the multi-child transport unit (i.e., adult control mode). The optional wheel disablement device comprises a dirigible wheel frame having a slot for receiving the dirigible wheel and at least one frame wheel. The dirigible wheel frame detachably connects to the stroller frame. The at least one frame wheel is rotatably and swivelably connected to the dirigible wheel frame. When the dirigible wheel frame is connected to the stroller frame, the dirigible wheel preferably rests inside the slot and the dirigible wheel frame holds the dirigible wheel off the ground and prevents the dirigible wheel from swiveling. When the optional wheel disablement device is not used, the multi-child transport unit is child control mode.

The cycle accessory system permits the user to quickly and easily convert between child control mode and adult control mode quickly, without the need for any tools. This permits the multiple mode changes of the multi-child transport unit during the same outing as circumstances and child behavior dictate.

A preferred feature of the cycle accessory system is the stroller-accessory connector. It is preferred that the stroller-accessory connector be releasable (i.e., removable) so that the child stroller can be operated with or without the cycle accessory system as the circumstances dictate. Similarly, it is also preferred that the cycle accessory system include removable rear wheels for the cycle apparatus so that the cycle apparatus can operate as a stand-alone tricycle when the cycle apparatus is not connected to the child stroller.

BRIEF DESCRIPTION OF THE DRAWINGS

FIG. 3 illustrates a view of the preferred embodiment of the multi-child transport unit with the wheel disablement device 78 attached, prior to the dirigible wheel 46 of the cycle apparatus 40 being rotated into the slot 82.

FIG. 3A illustrates a view of the preferred embodiment of the multi-child transport unit with the dirigible wheel frame 80 attached, after the dirigible wheel 46 of the cycle apparatus 40 has been rotated into the slot 82 ("adult control mode").

FIG. 4A also illustrates a location of a lockable joint 41 that could be employed for additional collapsibility of the cycle accessory 40.

FIG. 4B also illustrates another location of a lockable joint 41 that could be employed for additional collapsibility of the cycle accessory 40.

DESCRIPTIONS OF EMBODIMENTS

Figure 1:
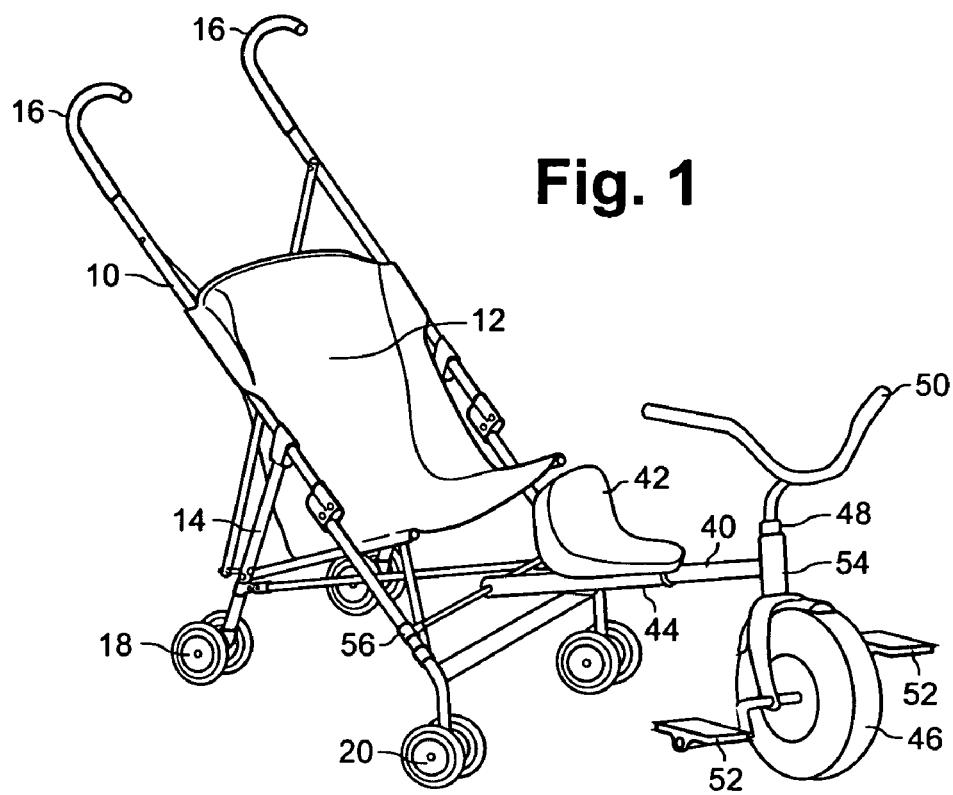
FIG. 1 illustrates a view of the preferred embodiment of the multi-child transport unit in child control mode.

The descriptions that follow are intended to aid in the understanding but not limit the actual scope of the invention. It is to be understood that the descriptions below are merely illustrative of the presently preferred embodiments of the invention and that no limitations are intended to the detail of construction or design herein shown other than as defined in the appended claims. The descriptions that follow describe the intended and preferred use of each embodiment of the cycle accessory system.

As used herein, the term "rotatably connected" refers to a wheel connection that allows the wheel to rotate about its axle. For example, as used herein, the back wheel of an ordinary automobile or an ordinary bicycle is rotatably connected to the automobile or bicycle.

As used herein, the term "rotatably and swivelably connected" refers to a wheel connection that allows the wheel to rotate about its axle and swivel about an axis different than its axle. For example, as used herein, the front wheel of an ordinary automobile, bicycle, shopping cart or child stroller is rotatably and swivelably connected to its respective automobile, bicycle, shopping cart, or child stroller.

As used herein, the term "releasably connected" or "releasably coupled" means that two parts may be joined together, un-joined and rejoined without substantially damaging either part.

The preferred embodiment of the cycle accessory system comprises a child stroller 10, a cycle apparatus 40, and an optional wheel disablement device 78. The child stroller 10 can be almost any child stroller. It is preferred, however, that the child stroller 10 have the following elements: a child seat 12 supported by a stroller frame 14, a pushable handle 16 connected to the stroller frame 14, at least one rear wheel 18 rotatably connected to the bottom of the stroller frame 14, and at least one front wheel 20 rotatably and swivelably connected to the bottom of the stroller frame 14. While many child strollers may work with the cycle accessory system, a preferred example of a child stroller 10 is the KOLCRAFT® umbrella stroller sold by Kolcraft Enterprises, Inc.

The pushable handle 16 of a typical child stroller permits an adult to power, turn and stop the child stroller. Thus, even when the multi-child transport unit is in child control mode, the adult has the ability to at least keep the multi-child transport unit stationary using the pushable handles 16.

The preferred embodiment of the cycle apparatus 40 comprises a second child seat 42, a cycle frame 44, a dirigible wheel 46, a dirigible wheel assembly 48, a handlebar 50, and pedals 52. As shown in FIG. 1, the second child seat 42 is supported by the cycle frame 44. It is preferable that the dirigible wheel 46 be rotatably and swivelably connected to a front end 54 of the cycle frame 44 by the dirigible wheel assembly 48. It is also preferred that the dirigible wheel 46 can swivel 360 degrees. This can be accomplished in many ways. This can be accomplished by employing a dirigible wheel assembly 48 similar to that used on most any bicycle or tricycle. The handlebar 50 can be connected to the dirigible wheel assembly 48, and the pedals 52 can be connected directly to the dirigible wheel 46. While many cycle apparatus or child tricycles can work with the cycle accessory system, an example of a cycle apparatus 40 that will work with the cycle accessory system can be created by purchasing a tricycle manufactured by Kettler International Inc. under the trademark KIDDIO™ and removing the rear wheels.

It is also preferred that the cycle accessory system include removable rear wheels 90 for the cycle apparatus 40 so that the cycle apparatus 40 can operate as a tricycle when the cycle apparatus 40 is not connected to the child stroller 10.

Figure 1A:
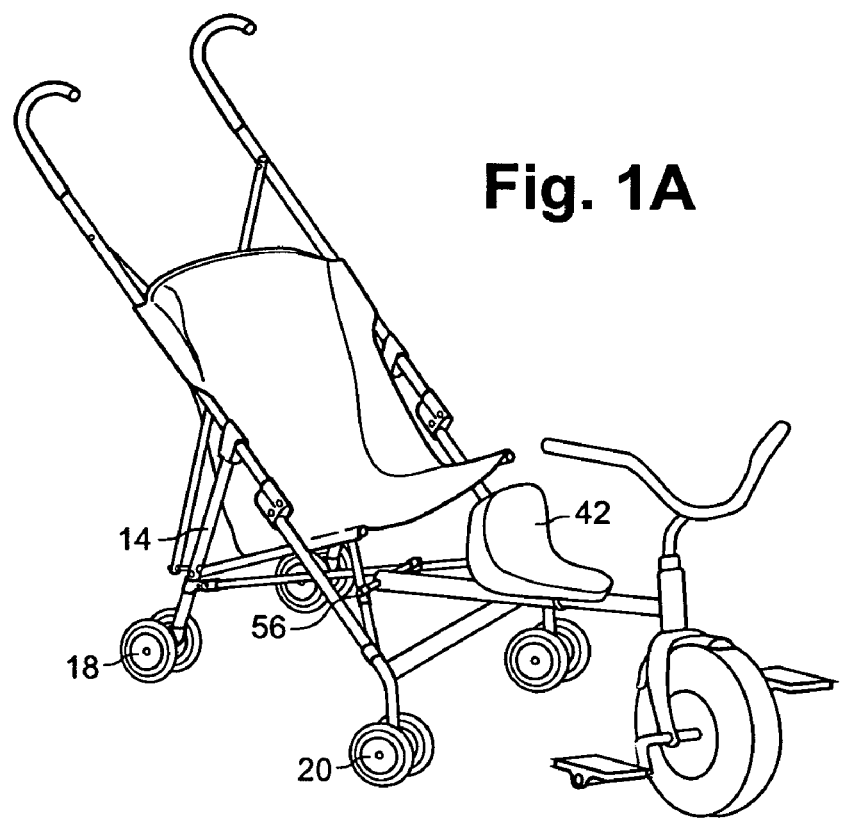
FIG. 1A illustrates a view of the preferred embodiment of the multi-child transport unit with an alternate placement of the stroller-accessory connector 56.

A preferred feature of the cycle accessory system is the stroller-accessory connector 56. The stroller-accessory connector 56 connects (or couples) the child stroller 10 to the cycle apparatus 40. It is preferred that the stroller-accessory connector 56 be releasable (i.e., removable) so that the child stroller 10 can be operated with or without the cycle apparatus 40 as the circumstances dictate. More specifically, as shown in FIG. 1, it is preferred to releasably couple the cycle frame 44 to the stroller frame 14. Depending on variables such as the orientation and capacity of the stroller frame 14 members and the cycle frame 44 members and/or the desired height of the second child seat 42, different connection locations can be used. For example, FIG. 1A shows a higher connection point for stroller-accessory connector 56.

Figure 5:
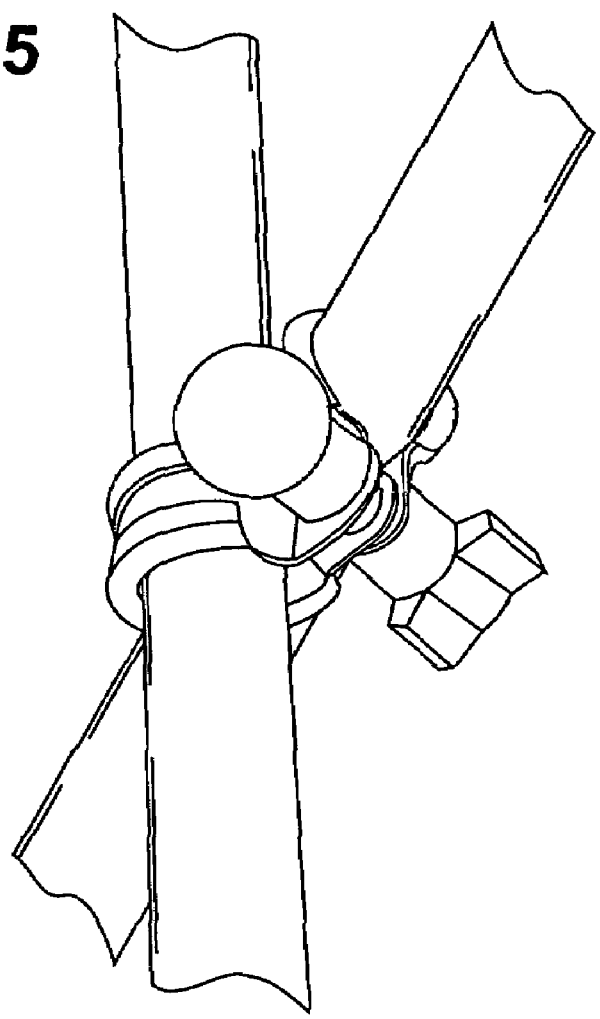
FIG. 5 illustrates a preferred embodiment of the stroller-accessory connector 56.

Many types of connectors can by used to releasably couple the child stroller 10 to the cycle apparatus 40. For example, connector parts manufactured by the Hillman Group including Hillman small clamping knob with threaded stud part #55386 10/32; a Hillman Ball knob ¾" diameter 10–32×⅜ part #55408; and a nylon spacer for ¼" screw part #58037 can be used as shown in FIG. 5 to releasably connect the cycle frame 44 to the stroller frame 14. While the stroller can be sold separately from the cycle accessory, it is preferred that they are sold together. If the cycle accessory and stroller are being sold together, it is preferred to weld a connector to the stroller and connect a coupling piece to the cycle accessory.

Through the use of an optional wheel disablement device 78, the cycle accessory system can be quickly and easily converted between child control mode and adult control mode, without the need for any tools. This permits the multiple mode changes of the multi-child transport unit during the same outing as circumstances and child behavior dictate.

Figure 2:
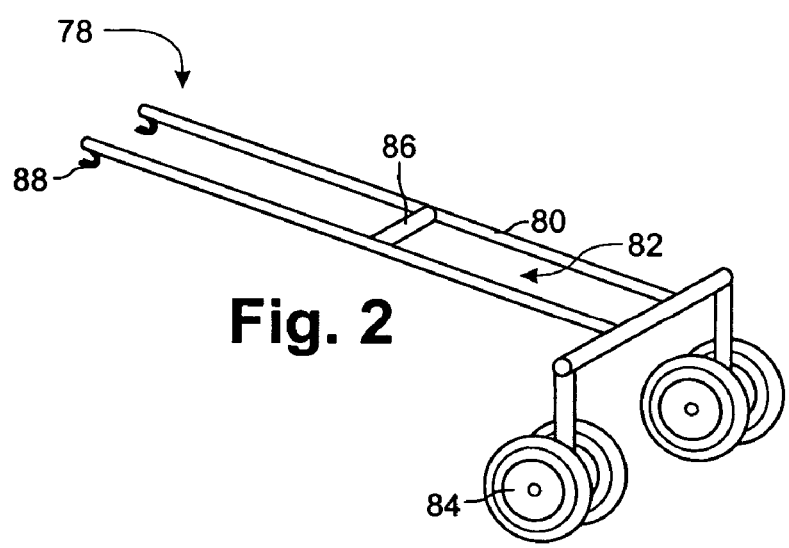
FIG. 2 illustrates a view of the preferred embodiment of the optional wheel disablement device 78, including a dirigible wheel frame 80 having a slot 82 formed by members of the dirigible wheel frame 80.
Figure 2A:
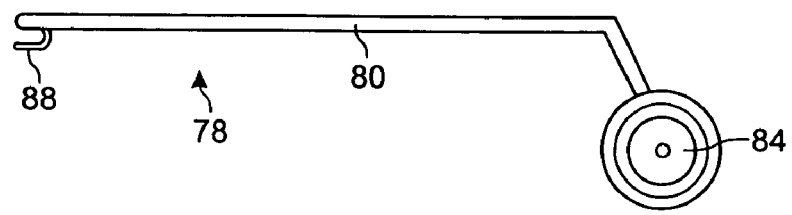
FIG. 2A illustrates a side view of the preferred embodiment of the optional wheel disablement device 78.

The optional wheel disablement device 78 comprises a dirigible wheel frame 80 having a slot 82 for receiving the dirigible wheel 46 and at least one frame wheel 84. The at least one frame wheel 84 should be rotatably and swivelably connected to the dirigible wheel frame 80. It is preferred that the at least one frame wheel 84 can swivel 360 degrees. It is also preferred that a pair of frame wheels 84 be connected to the dirigible wheel frame 80 as shown in FIG. 2.

Figure 3B:
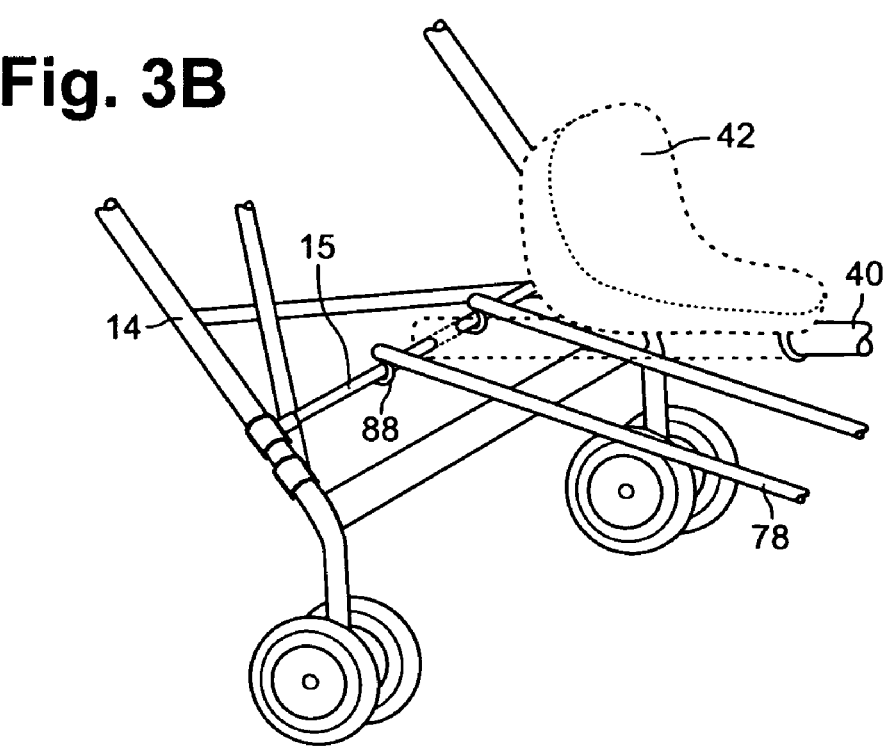
FIG. 3B illustrates a view of the connection between the dirigible wheel frame 80 and the cross member 15 of the cycle frame 44.

The dirigible wheel frame 80 can be made from a variety of materials. As shown in FIG. 2, the dirigible wheel frame can be constructed primarily by connecting longitudinal and transverse members to create a frame having a slot 82. There are many ways to accomplish this, but it is preferred to use a metal frame with welded connections. U-shaped steel hooks 88 can be welded to the longitudinal members of the dirigible wheel frame 80 to provide the releasable connection to the cross member 15 of the cycle frame 44 as shown in FIG. 3B. It is preferred to locate transverse frame member 86 so that dirigible wheel 46 helps to keep hooks 88 bearing against cross member 15 when operating in adult control mode. (See FIG. 3A).

When in adult control mode, the dirigible wheel frame 78 is connected to the stroller frame 14 as shown in FIG. 3A. In this mode, the dirigible wheel 46 rests inside the slot 82 and the dirigible wheel frame 78 holds the dirigible wheel 46 off the ground and prevents the dirigible wheel 46 from swiveling. As such, a child sitting on the second child seat 42 cannot power or steer the multi-child transport unit—all control is retained by the adult pusher. By having front wheels 20 and frame wheels 84 be both rotatably and swivelably connected, the adult can steer the multi-child transport unit in the same manner as steering the child stroller 10 alone.

Figure 3C:
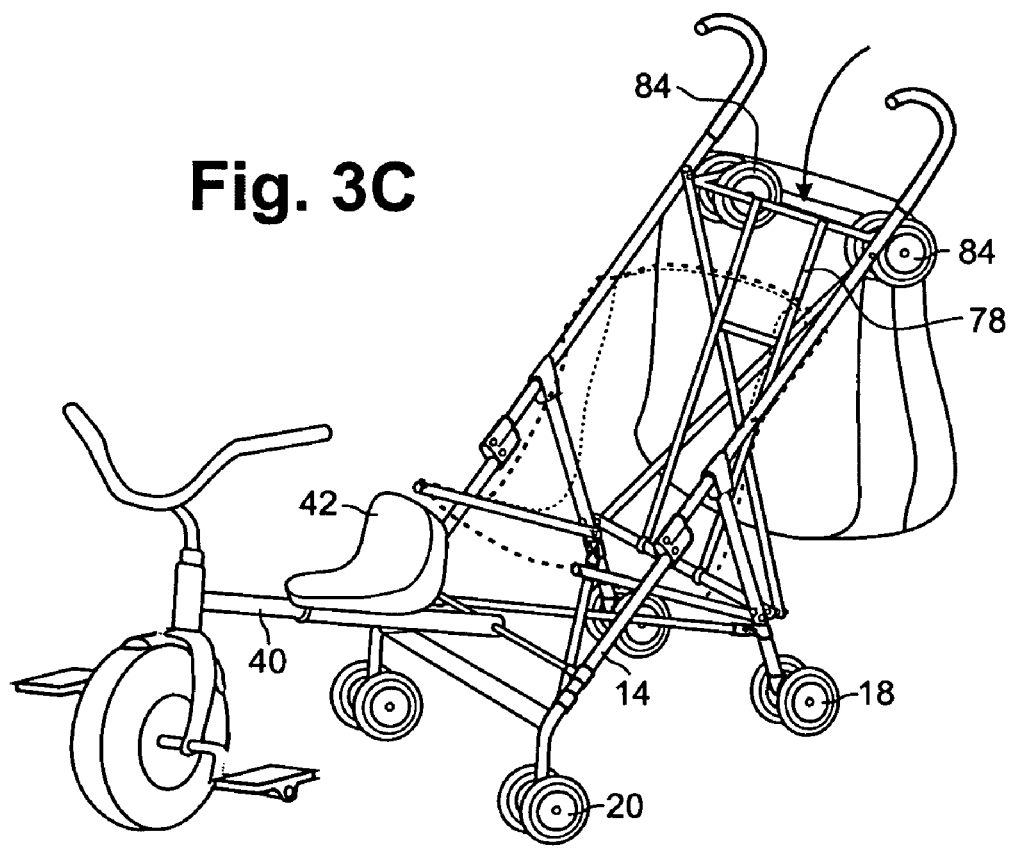
FIG. 3C illustrates view of the optional wheel disablement device 78 in a storage position on the stroller frame 14.
Figure 4:
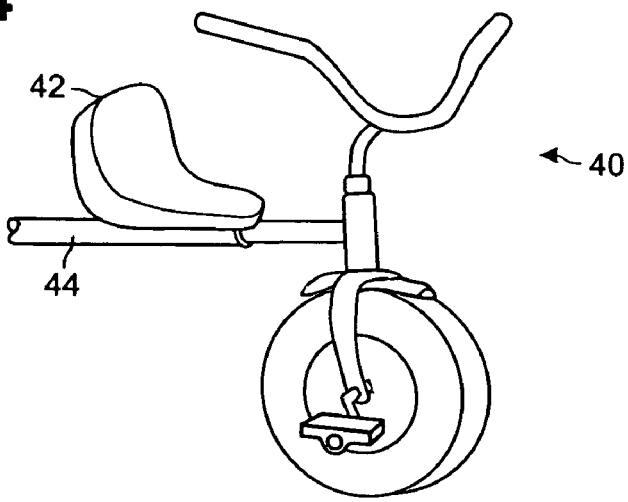
FIG. 4 illustrates a view of the preferred embodiment of the cycle accessory 40.
Figure 4A:
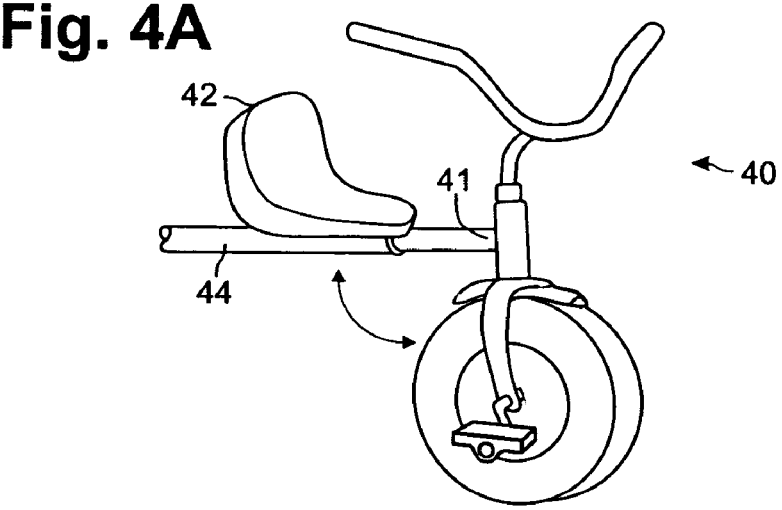
FIG. 4A illustrates a view of and embodiment of the cycle accessory 40 whereby the seat 42 can be set in different positions on the frame that are closer (shorter legs) or farther away (longer legs) from the handle bars. Optionally the seat 42 could also be adjusted up or down if desired.
Figure 4B:
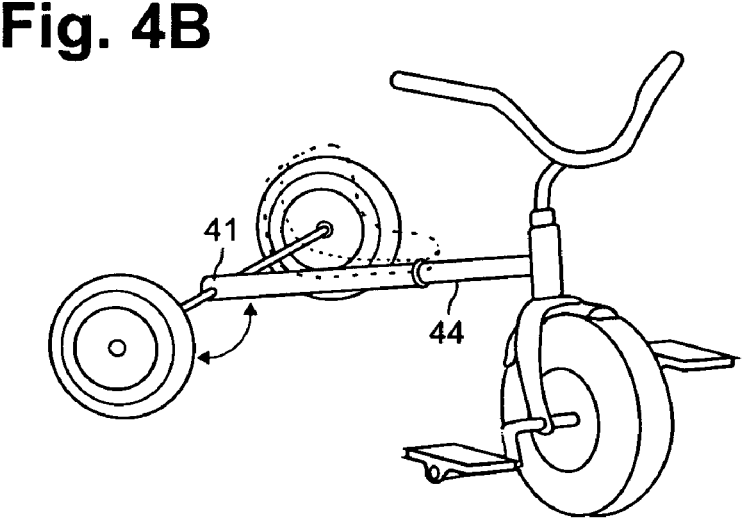
FIG. 4B illustrates a preferred embodiment of the cycle accessory 40 with a pair of removable rear wheels 90.
Figure 4C:
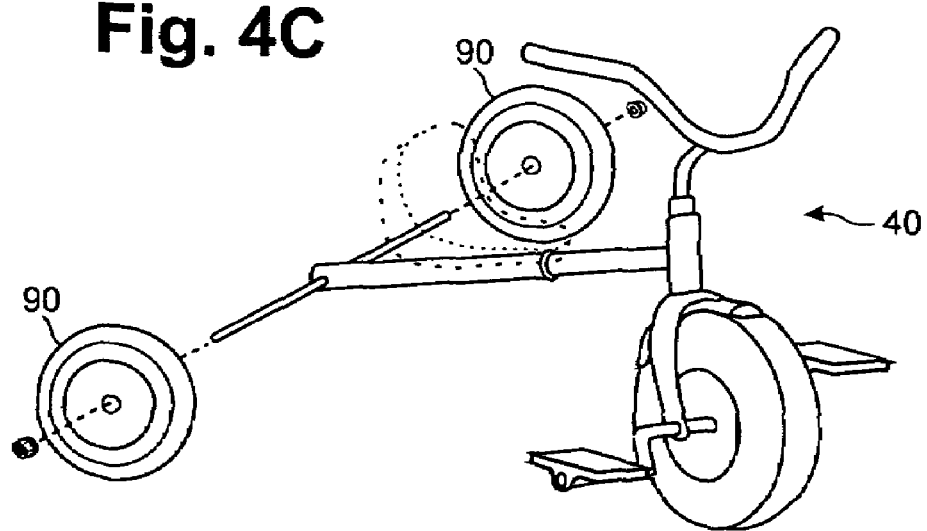
FIG. 4C illustrates a preferred embodiment of the cycle accessory 40 with a pair of removable rear wheels 90 removed.

In operation, the cycle accessory system has at least four different configurations: (1) the multi-child transport unit in child control mode (e.g., FIG. 1), (2) the multi-child transport unit in adult control mode (e.g., FIG. 3A), (3) the multi-child transport unit storage mode (e.g., FIG. 1B), and (4) tricycle mode (e.g., FIG. 4B). When the optional wheel disablement device is not in use, it can be stored as shown in FIG. 3C. Similarly, the stroller can be collapsed for storage once uncoupled from the cycle accessory. The cycle accessory can also be designed to be collapsible as known in the art. Among other things, a lockable joint 41 can be selectively placed on the cycle frame 44 as shown in FIGS. 4A and 4B.

Figure 1B:
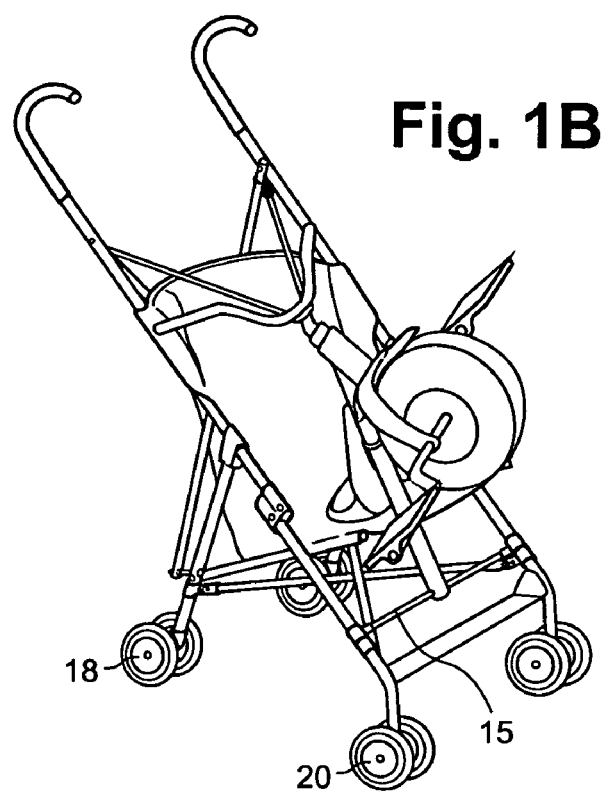
FIG. 1B illustrates a view of the preferred embodiment of the multi-child transport unit with the cycle apparatus rotated into a storage position and secured to the stroller frame 14 with an elastic cord ("storage mode").

In storage mode, the cycle accessory system can be compacted by storing the optional wheel disablement device as shown in FIG. 3C, the cycle apparatus 40 can be rotated and secured by a cord as shown in FIG. 1B. This more not only permits compact storage, but the multi-child transport unit can be easily maneuvered to a desired location because the child stroller wheels are still functional in storage mode.

A pair of removable rear wheels 90 enables the cycle apparatus to function as a tricycle when not connected to the child stroller. Many types of removable or quick release wheels are known. Examples of such quick-release wheels can be seen in a child-jogging strollers manufactured by the Baby Jogger Company of Richmond, Va. See e.g., website at www.babyjogger.com. By having removable rear wheels 90, the owner would not have to purchase a separate tricycle but could use the cycle accessory as a stand-alone tricycle when desired.

Although the invention has been described in detail with reference to one or more particular preferred embodiments, persons possessing ordinary skill in the art to which this invention pertains will appreciate that various modifications and enhancements may be made without departing from the spirit and scope of the claims that follow.

What is claimed is:

1. A cycle accessory for use with a child stroller, the child stroller having a child seat supported by a stroller frame, a pushable handle connected to the stroller frame, wherein the stroller frame rides on at least one rear wheel rotatably connected to the bottom of the stroller frame and at least one front wheel rotatably and swivelably connected to the bottom of the stroller frame, the cycle accessory comprising, a second child seat, a cycle frame, a dirigible wheel, a dirigible wheel assembly, a handlebar, and pedals, wherein the second child seat is supported by the cycle frame, the dirigible wheel is rotatably and swivelably connected to a front end of the cycle frame by the dirigible wheel assembly, the handlebar is connected to the dirigible wheel assembly, and the pedals are connected to the dirigible wheel, a stroller-accessory connector releasably coupling the cycle frame to the stroller frame, and a dirigible wheel disablement device comprising a dirigible wheel frame having a slot for receiving the dirigible wheel and at least one frame wheel, wherein the at least one frame wheel is rotatably and swivelably connected to the dirigible wheel frame and wherein the dirigible wheel frame detachably connects to the stroller frame whereby when the dirigible wheel frame is connected to the stroller frame, the dirigible wheel rests inside the slot and the dirigible wheel frame holds the dirigible wheel off the ground and prevents the dirigible wheel from swiveling.

2. A dirigible wheel disablement device for use with a multi-child transport unit, wherein multi-child transport unit comprises a child stroller, a cycle accessory and a stroller-accessory connector, the child stroller comprising a child seat supported by a stroller frame having a pushable handle connected to the stroller frame, wherein the stroller frame rides on at least one rear wheel rotatably connected to the bottom of the stroller frame and at least one front wheel rotatably and swivelably connected to the bottom of the stroller frame, the cycle accessory comprising a second child seat, a cycle frame, a dirigible wheel, a dirigible wheel assembly, a handlebar, and pedals, wherein the second child seat is supported by the cycle frame, the dirigible wheel is rotatably and swivelably connected to a front end of the cycle frame by the dirigible wheel assembly, the handlebar is connected to the dirigible wheel assembly, and the pedals are connected to the dirigible wheel, and the stroller-accessory connector releasably coupling the cycle frame to the stroller frame, the dirigible wheel disablement device comprising, a dirigible wheel frame having a slot for receiving the dirigible wheel and at least one frame wheel, wherein the at least one frame wheel is rotatably and swivelably connected to the dirigible wheel frame and wherein the dirigible wheel frame detachably connects to the stroller frame whereby when the dirigible wheel frame is connected to the stroller frame, the dirigible wheel rests inside the slot and the dirigible wheel frame holds the dirigible wheel off the ground and prevents the dirigible wheel from swiveling.

3. A multi-child transport unit comprising, a child stroller, the child stroller comprising a child seat supported by a stroller frame having a pushable handle connected to the stroller frame, wherein the stroller frame rides on at least one rear wheel rotatably connected to the bottom of the stroller frame and at least one front wheel rotatably and swivelably connected to the bottom of the stroller frame, a cycle accessory, the cycle accessory comprising a second child seat, a cycle frame, a dirigible wheel, a dirigible wheel assembly, a handlebar, and pedals, wherein the second child seat is supported by the cycle frame, the dirigible wheel is rotatably and swivelably connected to a front end of the cycle frame by the dirigible wheel assembly, the handlebar is connected to the dirigible wheel assembly, and the pedals are connected to the dirigible wheel, a stroller-accessory connector releasably coupling the cycle frame to the stroller frame, and a dirigible wheel disablement device comprising a dirigible wheel frame having a slot for receiving the dirigible wheel and at least one frame wheel, wherein the at least one frame wheel is rotatably and swivelably connected to the dirigible wheel frame and wherein the dirigible wheel frame detachably connects to the stroller frame whereby when the dirigible wheel frame is connected to the stroller frame, the dirigible wheel rests inside the slot and the dirigible wheel frame holds the dirigible wheel off the ground and prevents the dirigible wheel from swiveling.

4. A combination multi-child transport unit, child stroller, and child tricycle comprising, a child stroller, the child stroller comprising a child seat supported by a stroller frame having a pushable handle connected to the stroller frame, wherein the stroller frame rides on at least one rear wheel rotatably connected to the bottom of the stroller frame and at least one front wheel rotatably and swivelably connected to the bottom of the stroller frame, a cycle accessory, the cycle accessory comprising a second child seat, a cycle frame, a dirigible wheel, a dirigible wheel assembly, a handlebar, pedals, and a pair of removable rear wheels, wherein the second child seat is supported by the cycle frame, the dirigible wheel is rotatably and swivelably connected to a front end of the cycle frame by the dirigible wheel assembly, the handlebar is connected to the dirigible wheel assembly, and the pedals are connected to the dirigible wheel, a stroller-accessory connector releasably coupling the cycle frame to the stroller frame whereby the convertible multi-child transport unit can be converted from a two-cycle transport unit to a child stroller and a tricycle by disconnecting the stroller-accessory connector and connecting the pair of removable rear wheels to the cycle frame, and a dirigible wheel disablement device comprising a dirigible wheel frame having a slot for receiving the dirigible wheel and at least one frame wheel, wherein the at least one frame wheel is rotatably and swivelably connected to the dirigible wheel frame and wherein the dirigible wheel frame detachably connects to the stroller frame whereby when the dirigible wheel frame is connected to the stroller frame, the dirigible wheel rests inside the slot and the dirigible wheel frame holds the dirigible wheel off the ground and prevents the dirigible wheel from swiveling.

\* \* \* \* \*